United States Patent
Furuyama et al.

(10) Patent No.: US 8,534,452 B2
(45) Date of Patent: Sep. 17, 2013

(54) EQUIPMENT FOR DISCHARGING A FIXED AMOUNT OF A PARTICULATE BODY

(75) Inventors: Kuninori Furuyama, Tokyo (JP); Masahiro Miya, Tokyo (JP); Ryo Suzuki, Tokyo (JP)

(73) Assignee: J-Power EnTech, Inc., Tokyo (JP)

(*) Notice: Subject to any disclaimer, the term of this patent is extended or adjusted under 35 U.S.C. 154(b) by 0 days.

(21) Appl. No.: 13/203,081

(22) PCT Filed: Feb. 26, 2009

(86) PCT No.: PCT/JP2009/053548
§ 371 (c)(1),
(2), (4) Date: Dec. 5, 2011

(87) PCT Pub. No.: WO2010/097926
PCT Pub. Date: Sep. 2, 2010

(65) Prior Publication Data
US 2012/0061206 A1 Mar. 15, 2012

(51) Int. Cl.
*B65G 47/19* (2006.01)

(52) U.S. Cl.
USPC .................. 198/532; 198/562; 198/565

(58) Field of Classification Search
USPC ......... 198/526, 532, 540, 562, 565; 222/132, 222/135, 145.8
See application file for complete search history.

(56) References Cited

U.S. PATENT DOCUMENTS

| | | | | |
|---|---|---|---|---|
| 2,681,639 A | * | 6/1954 | Littlefield | 198/526 |
| 2,684,288 A | * | 7/1954 | De Smet | 198/562 |
| 3,285,580 A | * | 11/1966 | Renaudette | 198/565 |
| 4,324,764 A | * | 4/1982 | Hasegawa et al. | 198/565 |
| 5,076,702 A | * | 12/1991 | Smals | 366/18 |

FOREIGN PATENT DOCUMENTS

| | | |
|---|---|---|
| JP | 62-181529 A | 8/1987 |
| JP | 11-76794 A | 7/1989 |
| JP | 53-15772 A | 11/1993 |
| JP | 60-43638 A | 2/2004 |
| JP | 2005-213042 A | 8/2005 |
| JP | 2004-51338 A | 9/2005 |

OTHER PUBLICATIONS

Translation of International Search Report Dated Mar. 16, 2009.
Concise Statement of Relevance for Japanese Utility Model Nos. 60-43638, 53-15772 and 62-181529.

* cited by examiner

*Primary Examiner* — James R Bidwell
(74) *Attorney, Agent, or Firm* — Norris McLaughlin & Marcus, P.A.

(57) ABSTRACT

Fixed amount discharging equipment for simultaneously discharging a particulate body from a plurality of containers containing the particulate body, comprising a casing to the interior of which is provided a belt conveyor and having a particulate body discharge hole below the carrying direction end of the belt conveyor, and a plurality of supply arranged in the carrying direction of the belt conveyor and passing through the casing, lower ends thereof penetrating into the casing and being arranged above the belt of the belt conveyor, the lower ends of the supply pipes being such that the downstream sides thereof in the belt carrying direction have notches of a predetermined length from the end faces upward.

6 Claims, 5 Drawing Sheets

EQUIPMENT FOR DISCHARGING A FIXED AMOUNT OF A PARTICULATE BODY

This application is a 371 application of PCT/JP2009/053548 filed Feb. 26, 2009.

TECHNICAL FIELD

The present invention relates to a discharging equipment for discharging, from a plurality of containers containing a particulate body, the particulate body simultaneously and continuously.

BACKGROUND ART

As the discharging machine for continuously discharging a fixed amount of a particulate body from a container containing the particulate body, there are in use a belt feeder, a vibration feeder, a screw feeder, a rotary feeder, a roll feeder, etc. of these, a belt feeder and a roll feeder are often used when it is necessary to set a precise flow rate.

In the industry handling a particulate body, there is often needed an equipment for discharging a particulate body simultaneously from a plurality of containers each containing the particulate body and carrying the particulate body into a container. In such a case, one discharging machine such as mentioned above is provided below each of the containers; and a belt conveyor or the like is used in order to carry the particulate body discharged from each container, to a particular place.

An example of such an equipment is shown in FIG. 5. In this discharging equipment 120, roll feeders 90a, 90b, ... 90e for discharging a particulate body are provided below a plurality of containers 10a, 10b, ... 10e containing the particulate body. Below the roll feeders 90a, 90b, ... 90e is provided a belt conveyor 122 for transferring the particulate body discharged.

The belt conveyor 122 is accommodated in a casing 121. Supply pipes 125a, 125b, ... 125e are connected to the outlet sides of the roll feeders 90a, 90b, ... 90e, penetrate the top of the casing 121, and are inserted into the casing 121; and the front end portions of the supply pipes are arranged along the carrying direction of the belt. The particulate bodies discharged from the roll feeders 90a, 90b, ... 90e pass through the supply pipes 125a, 125b, ... 125e and are supplied onto the belt conveyor 122. The casing 121 has a particulate body outlet 124 below the end of the carrying direction of the belt conveyor 122. The particulate body supplied from the supply pipes 125a, 125b, ... 125e onto the belt conveyor 122 are carried to the carrying direction (arrow X) of the belt conveyor 122 and are discharged from the particulate body outlet 124 outside the belt conveyor 122.

Such a discharging equipment can discharge a particulate body contained in a plurality of containers, simultaneously and continuously and can carry the discharged particulate body to a particular place. However, since this system has the roll feeders 90a, 90b, ... 90e and the belt conveyor 122, the numbers of the rotating machines and electric motors for driving them become inevitably large, increasing the equipment cost and the expenses for maintenance of the rotating machines and electric motors. Further, since the roll feeders and the belt conveyor are provided below the containers of particulate body, each container need be provided at a high position, requiring a large installment space in a vertical direction.

In order to solve the problems, Patent Literature 1 proposes a discharging machine which is provided with partitions at the inlet portion of a roll feeder and thereby can continuously discharge a particulate body from a plurality of containers. In this discharging machine, a plurality of inlet passages of particulate body communicating with a plurality of containers are formed on the roll surfaces along the roll axial direction. Owing to this structure, the discharging machine can continuously discharge a particulate body from the plurality of containers.

With this discharging machine, the plurality of roll feeders required in the system of FIG. 5 can be replaced with a single discharging machine. Accordingly, the numbers of rotating machines and electric motors can be reduced. However, in this discharging machine, a plurality of chutes is needed in order to supply a particulate body to the discharging machine from containers. These chutes need to have an elevation angle which is at least the angle of rest of particulate body. Consequently, a large installment space is required in a vertical direction, posing a problem. Patent Literature 1: JP-A-1999-76794

DISCLOSURE OF THE INVENTION

Techinical Problem

The first aim of the present invention is to provide a discharging equipment for discharging fixed amounts of particulate bodies from a plurality of containers containing the particulate bodies, simultaneously and continuously. The second aim is to provide a discharging equipment in which the numbers of rotating machines and electric motors are small and the equipment cost and maintenance expense are low. The third aim is to provide a discharging equipment not requiring a large installment space in the vertical direction. The fourth aim is to provide a discharging equipment capable of carrying the discharged particulate bodies to a particular place. The fifth aim is to provide a discharging equipment capable of discharging particulate bodies at a high quantitative precision.

Techinical Solution

The present invention is as described below.

[1] A fixed amount discharging equipment for simultaneously discharging a particulate body from a plurality of containers containing the particulate body, which comprises a casing having a belt conveyor inside and a particulate body outlet below the end of the carrying direction of the belt conveyor, and a plurality of supply pipes arranged along the carrying direction of the belt conveyor, whose lower end portions penetrate into the casing and whose lower ends extend to above the belt of the belt conveyor, in which equipment the lower end portion of each supply pipe has, at its downstream side in the carrying direction of belt, a notch of predetermined length extending upward from the lower end of pipe.

[2] The fixed amount discharging equipment according to [1], wherein the first supply pipe from the upstream side of belt carrying direction is provided so that the distance between the lower end of pipe and the upper surface of belt becomes 2 to 3 times the average particle diameter of the particulate body.

[3] The fixed amount discharging equipment according to [1], wherein the second and later supply pipes from the upstream side of belt carrying direction are each provided, at the lower end portion, with a V-shaped dispersing plate which is gradually larger from the upstream side toward the downstream side.

[4] The fixed amount discharging equipment according to [1], wherein the second and later supply pipes from the upstream side of belt carrying direction are each provided so that the distance between the lower end of pipe and the upper surface of belt becomes 3 to 5 times the average particle diameter of the particulate body.

[5] The fixed amount discharging equipment according to any of [1] to [4], wherein a belt support is provided slidably at the lower surface portion of the belt, corresponding to the lower end of each supply pipe, in contact with the belt.

Effects of the Inventione

The discharging equipment of the present invention can discharge fixed amounts of particulate bodies from a plurality of containers containing the particulate bodies, simultaneously and continuously. This discharging equipment uses small numbers of rotating machines and electric motors and accordingly requires small amounts of equipment costs and maintenance expenses. The discharging equipment requires no large installment space in the vertical direction. Further, the discharging equipment can carry the particulate bodies discharged, together to a particular place. The discharging equipment can discharge particulate bodies at a high quantitative precision.

Figure 1:
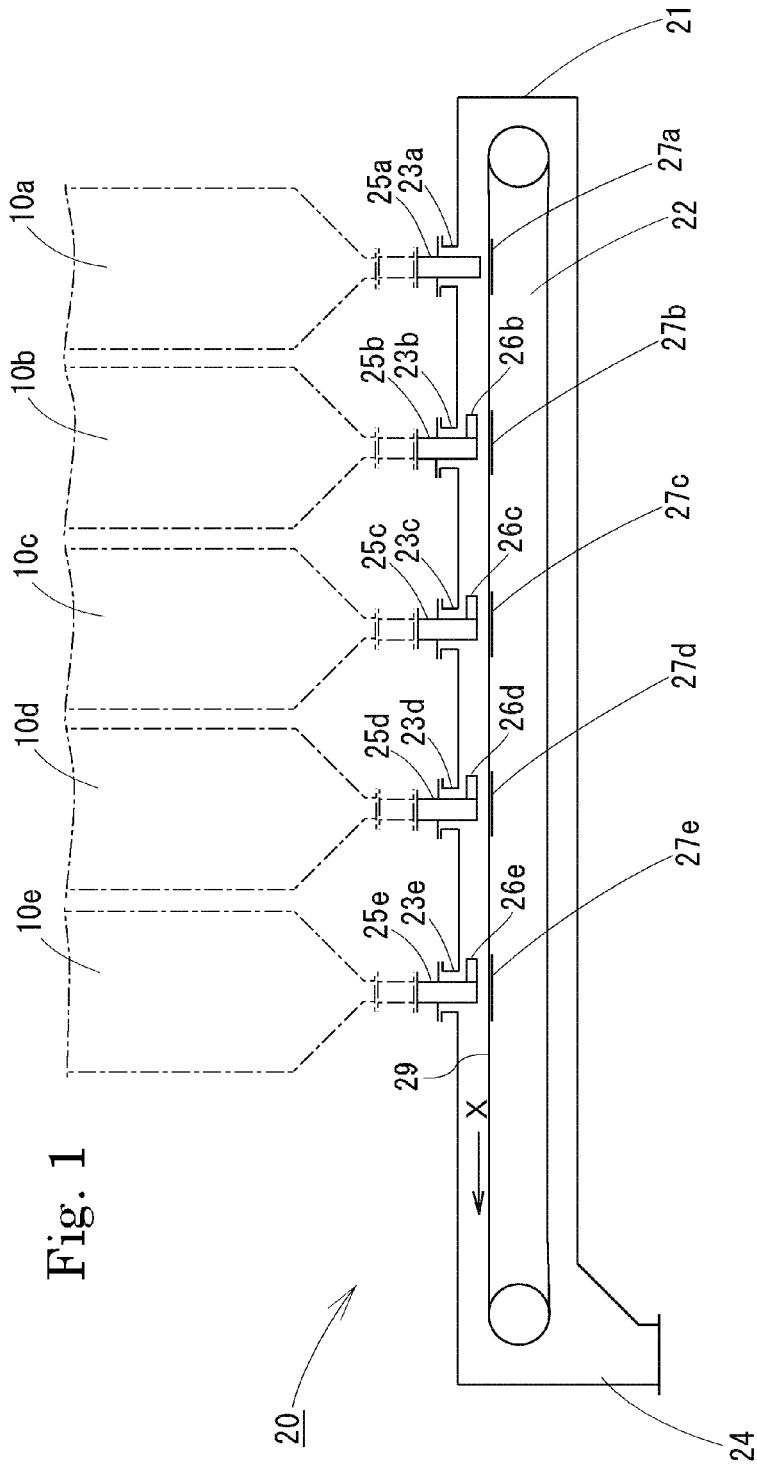
FIG. 1 is a schematic vertical sectional view showing an example of the discharging equipment of the present invention.

EXPLANATION OF SYMBOLS 10a to 10e: each a container
20, 120: each a discharging equipment
21, 121: each a casing
22, 122: each a belt conveyor
23a to 23e: each a particulate body inlet
24, 124: each a particulate body outlet
25a to 25e, 125a to 125e: each a supply pipe
26b to 26e: each a dispersing plate
27a to 27e: each a belt support
29: a belt
30a to 30c: each a notch
90a to 90e: each a roll feeder

BEST MODE FOR CARRING OUT THE INVENTION

An embodiment of the present invention is explained below referring to the accompanying drawings. As shown in FIG. 1, the discharging equipment 20 of the present invention is a discharging equipment which discharges particulate bodies simultaneously from a plurality (5 in FIG. 1) of containers 10a, 10b, . . . 10e each containing the particulate body. In the present invention, the container includes not only a container storing a particulate body but also apparatuses through which a particulate body passes in a predetermined residence time for continuous treatment. As such a container, there are a reactor, heat exchanger, etc. used in industrial processes.

The discharging equipment 20 comprises a casing 21 equipped with a plurality of particulate body inlets 23a, 23b, . . . 23e and a single particulate body outlet; a belt conveyor 22 provided inside the casing 21; and supply pipes 25a, 25b, . . . 25e fitted to the particulate body inlets 23a, 23b, . . . 23e.

The casing 21 functions as a support for fitting the supply pipes 25a, 25b, . . . 25e thereto and also as a cover which covers the whole belt conveyor 22 for sheltering from dust and rain. When the containers 10a, 10b, . . . 10e are, for example, a reactor, the casing 21 may have a closed structure so that there is no gas flow between the inside and outside of casing 21. Preferably, the casing 21 is as necessary provided with an inspection window or an inspection hole, for interior inspection.

The particulate body inlets 23a, 23b, . . . 23e are formed on the upper surface of casing 21 roughly linearly in the carrying direction (arrow X direction) of belt conveyor 22. The particulate body outlet 24 is provided below the casing 22, at the end portion of the carrying direction of belt conveyor 22.

The belt 29 of belt conveyor 22 runs in the X direction; carries the particulate body supplied continuously onto the belt 29 from the particulate body inlets 23a, 23b, . . . 23e, to the particulate body outlet 24; and discharges the carried particulate body continuously though the particulate body outlet to outside of the casing 21. For discharging the particulate body at a fixed amount rate, it is preferred that the belt 29 used has a flat surface at the side on which the particulate body is mounted, and shows a small vertical shaking during the running.

When it is needed to discharge a particulate body at a high quantitative precision, there are preferably provided belt supports 27a, 27b, . . . 27e slidably beneath the lower surface of belt 29.

Figure 2:
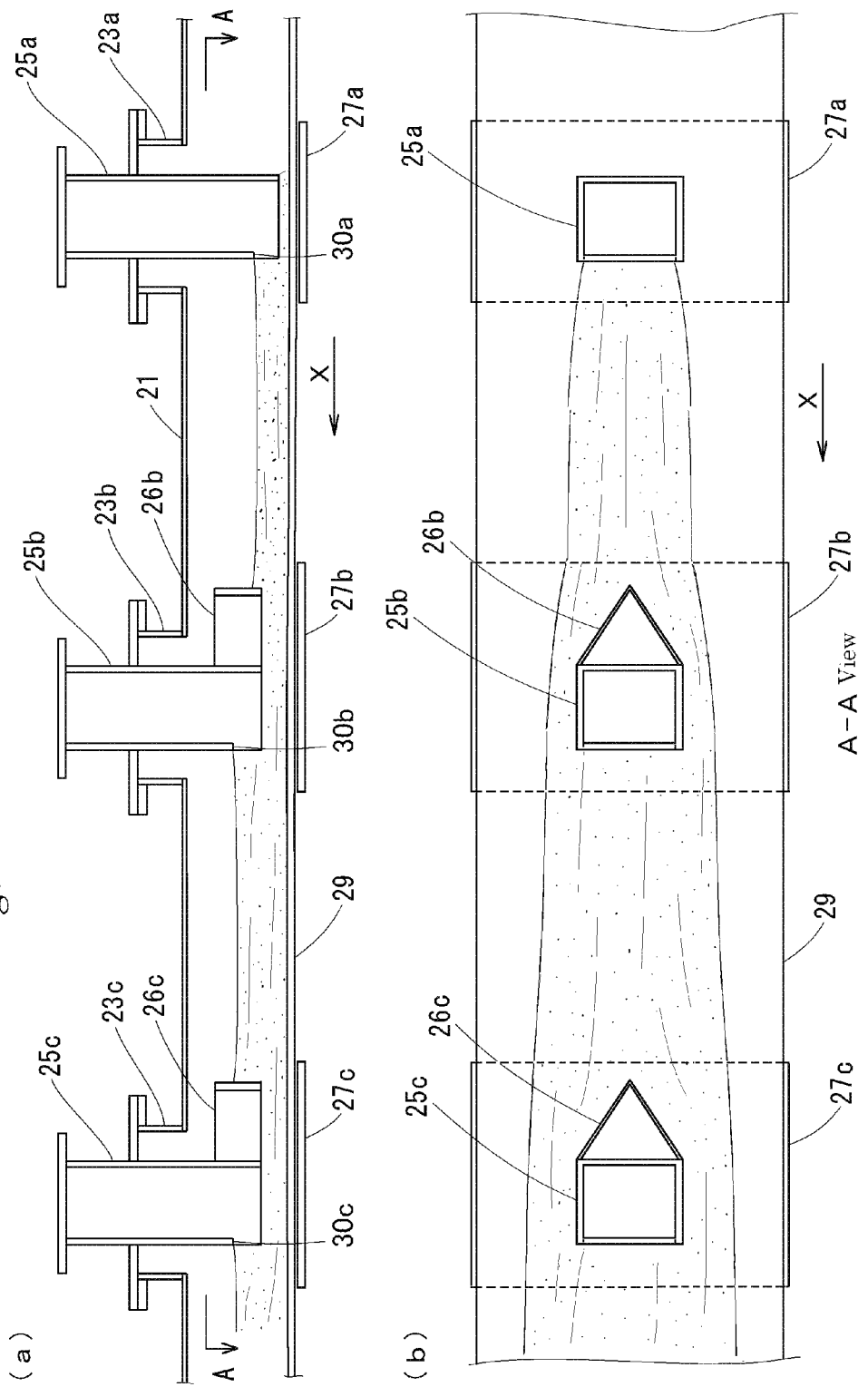
FIG. 2 shows an example of the main portion of the discharging equipment, wherein (a) is a schematic vertical sectional view and (b) is a schematic transverse sectional view taken at the A-A line of (a).

The belt supports 27a, 27b, . . . 27e are provided below the supply pipes 25a, 25b, . . . 25e. As shown in FIG. 1 and FIG. 2, the belt supports 27a, 27b, . . . 27e support the lower surface of belt 29 slidably. The belt supports 27a, 27b, . . . 27e have a flat upper surface and, as necessary, are fixed to the casing 12.

The supply pipes 25a, 25b, . . . 25e have a cylindrical shape and are fitted to the particulate body inlets 23a, 23b, . . . 23e so as to penetrate the upper side of casing 21. The upper end portions of supply pipes 25a, 25b, . . . 25e project from the casing 21 and provide connecting portions to the containers 10a, 10b, . . . 10e. The lower end portions of supply pipes 25a, 25b, . . . 25e are inserted into the casing 21 and the lower ends thereof are positioned above the belt 29.

The discharging equipment 20 of the present invention is an equipment for simultaneously discharging particulate bodies from a plurality of containers 10a, 10b, . . . 10e, using a belt conveyor 22. The positional relationship between the lower ends of supply pipes 25a, 25b, . . . 25e and the belt 29 is such that the lower ends of the plurality of supply pipes 25a, 25b, ... 25e are above one running locus of belt 29. Ordinarily, the supply pipes 25a, 25b, ... 25e are arranged linearly along the carrying direction of belt 29. As necessary, the supply pipes may be arranged in two or more rows or at random.

The supply pipes 25a, 25b, ... 25e may have any sectional shape such as circular, oval, polygonal (e.g. triangular or tetragonal) or the like. However, the sectional shape of lower end portion is preferably rectangular. The shapes of the lower end portions of supply pipes 25a, 25b, ... 25e are explained referring to FIG. 2 to FIG. 4.

FIG. 2 shows supply pipes 25a, 25b and 25c and the flow of particulate body. FIG. 2(a) is a vertical sectional view, and FIG. 2(b) is a transverse sectional view taken at the A-A line of FIG. 2(a). The belt 29 of the belt conveyor 22 runs to a direction shown by arrow X. Each of the lower end portion of the supply pipes 25a, 25b and 25c has, at the downstream side in the carrying direction of belt, a notch of predetermined length extending upward from the lower end of pipe. Accordingly, a particulate body is discharged from each of the notches 30a, 30b and 30c with the running of belt 29.

Figure 3:
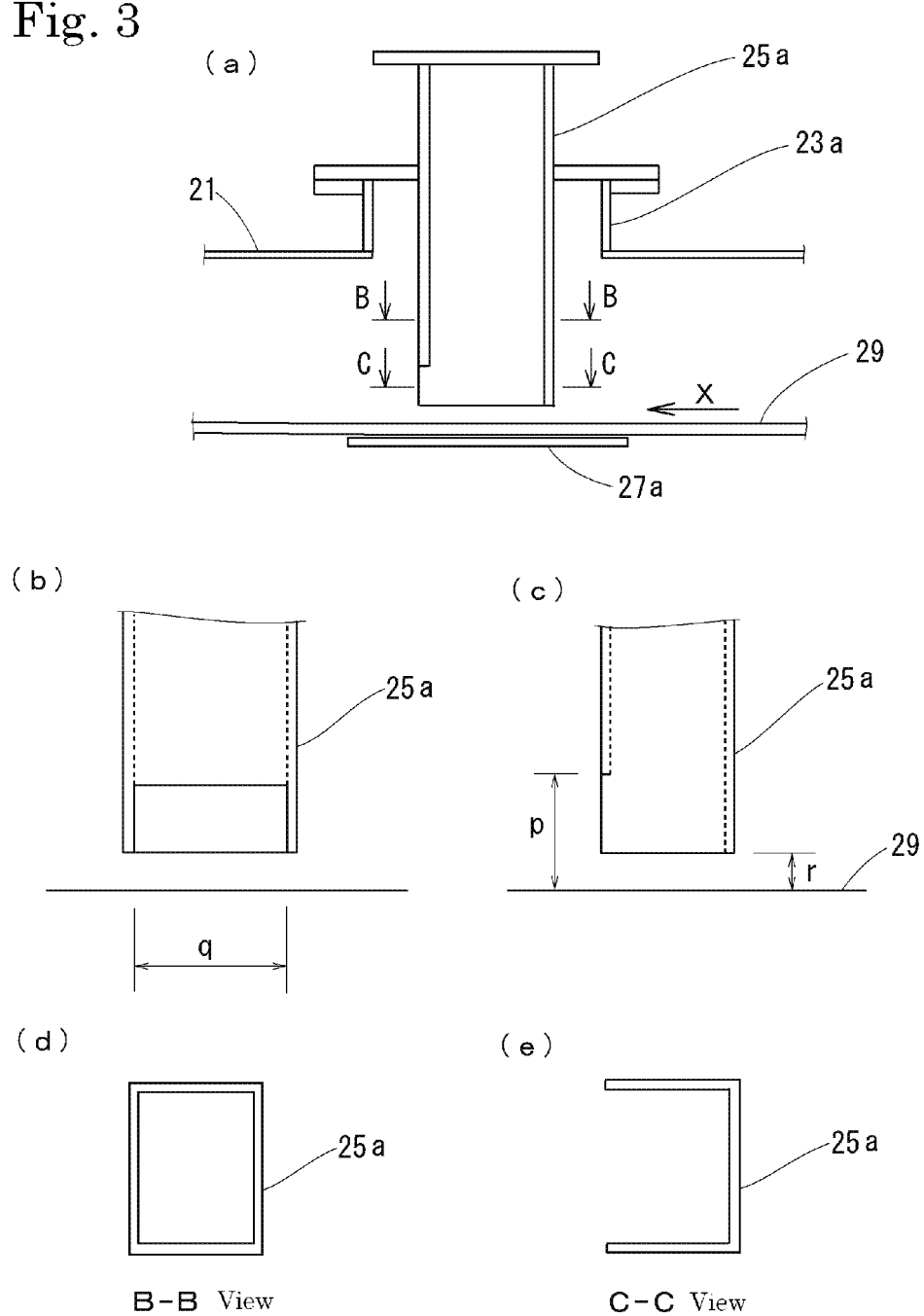
FIG. 3 shows a first supply pipe from the upstream side, wherein (a) is a total view, (b) is a front view, (c) is a side view, (d) is a transverse sectional view taken at the B-B line of (a), and (e) is a transverse sectional view taken at the C-C line of (a).

FIG. 3 shows a supply pipe 25a which is the first from the upstream side of belt carrying direction in the discharging equipment 20. In FIG. 3, (a) is a total view of supply pipe 25a; (b) is a front view of lower end portion seen from the downstream side of belt carrying direction; (c) is a side view of lower end portion; (d) is a transverse sectional view taken at the B-B line of (a); and (e) is a transverse sectional view taken at the C-C line of (a).

The amount Q (m³/h) of particulate body discharged from supply pipe 25a is represented by the following formula.

$$Q = k \cdot p \cdot q \cdot v \quad \text{(formula 1)}$$

Here, each variable is the following value.
k: a flow coefficient determined by particulate body (–)
p: a notch height (m)
q: a notch width (m)
v: a running speed of belt (m/h)

The distance r between the lower end of supply pipe 25a and the upper surface of belt 29 is preferably as small as possible for securing a constant discharging amount. However, the sliding of the lower end of supply pipe 25a on the upper surface of belt 29 is not preferred because it damages the belt 29. Further, the particulate body adhering to the belt 29 may continue to rotate with the belt without being discharged from the particulate body outlet, which may invite the sandwiching of particulate body between the lower end of supply pipe 25a and the belt 29. Accordingly, the distance r is preferably 2 to 3 times the average particle diameter of particulate body. In the formula (1), the notch height p is a total length of the length of the notch provided lower end portion of supply pipe and the distance r between the lower end of supply pipe and the upper surface of belt. Therefore, the notch height p includes r.

The supply pipes 25b, 25c, ... 25e, which are the second and later from the upstream side of belt running direction, have the same shape as the supply pipe 25a. However, the particulate body carried from the upstream side hits the lower end portions of supply pipes 25b, 25c, ... 25e and applies a large force to the lower end portions. Consequently, the driving power of belt conveyor 22 increases inevitably, shortening the life of belt 29.

Therefore, it is preferred to fit, to the lower end portions of second and later supply pipes 25b, 25c, ... 25e, V-shaped dispersing plates 26b, 26c, ... 26e whose horizontal direction widths increase gradually from the upstream side toward the downstream side.

Figure 4:
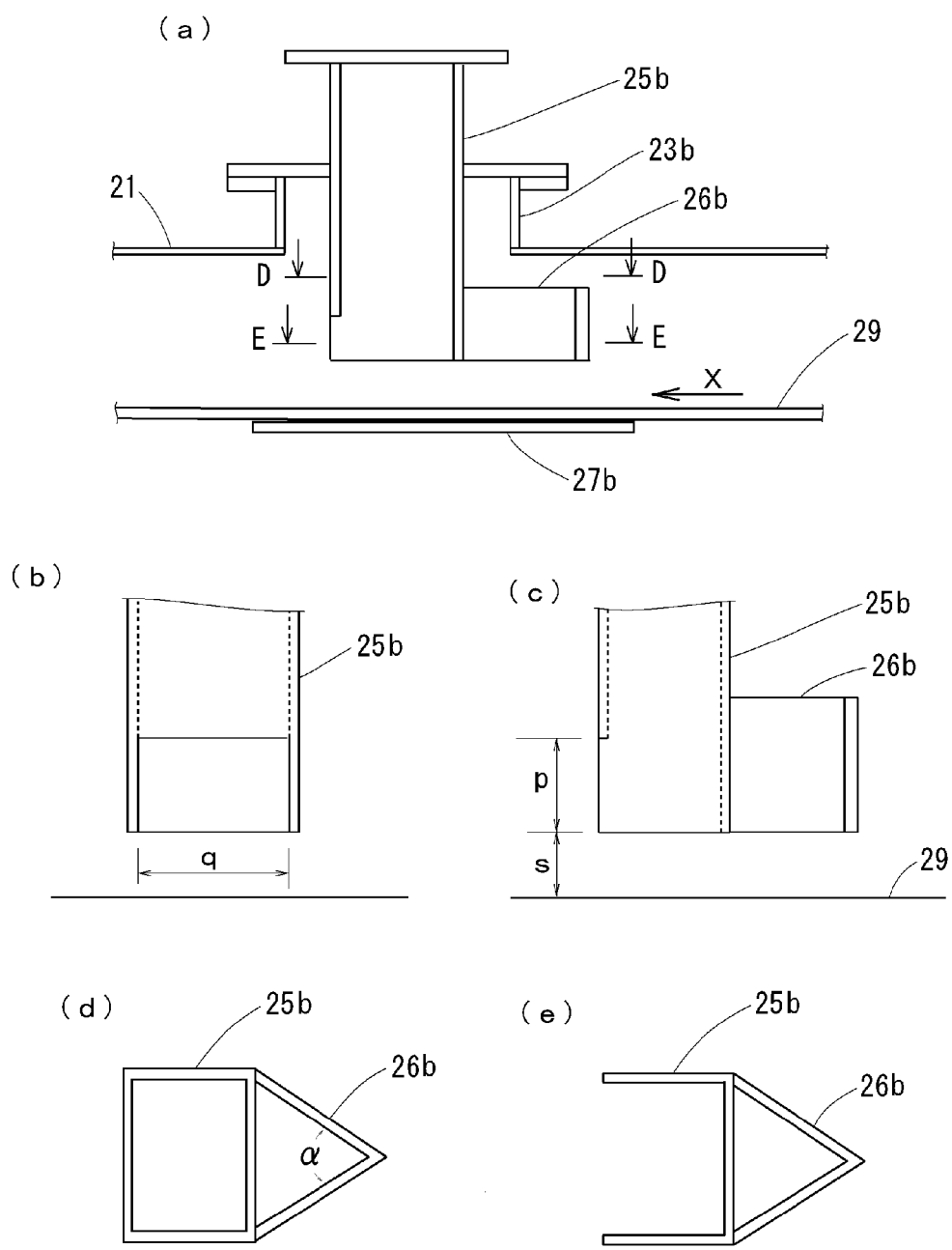
FIG. 4 shows a second supply pipe from the upstream side, wherein (a) is a total view, (b) is a front view, (c) is a side view, (d) is a transverse sectional view taken at the D-D line of (a), and (e) is a transverse sectional view taken at the E-E line of (a).
Figure 5:
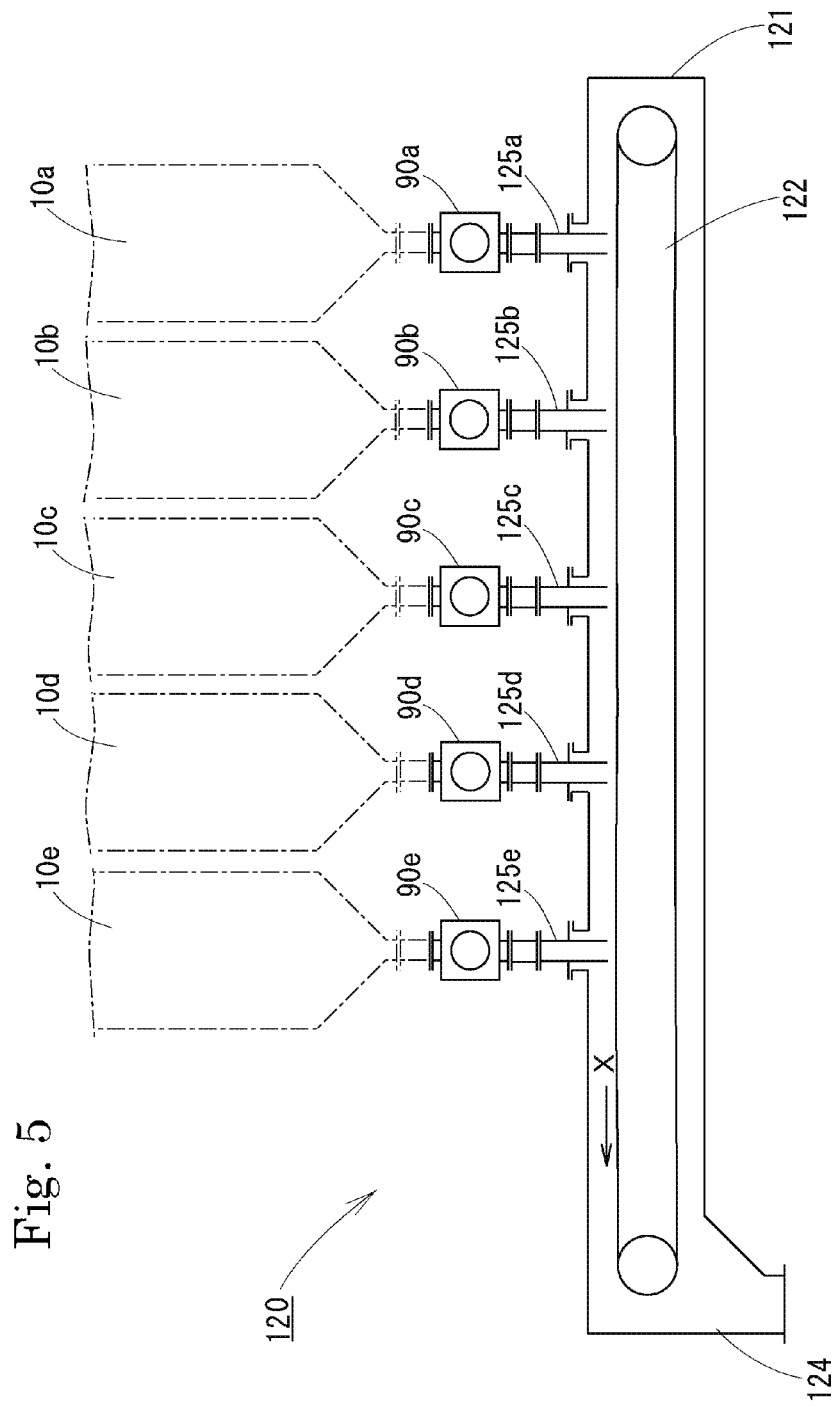
FIG. 5 is a schematic vertical sectional view showing a conventional discharging equipment.

FIG. 4 shows a supply pipe 25b which is the second from the upstream side of belt running direction in the discharging equipment 20. In FIG. 4, (a) is a total view of supply pipe 25b; (b) is a front view of lower end portion seen from the downstream side of belt carrying direction; (c) is a side view of lower end portion; (d) is a transverse sectional view taken at the D-D line of (a); and (e) is a transverse sectional view taken at the E-E line of (a).

In the supply pipe 25b, the particulate body carried from the upstream is pushed toward the two width directions of belt 29 by the dispersing plate 26b. As a result, the force applied to the downstream supply pipe 25c can be reduced. By employing the dispersing plates 26b, 26c, ... 26e, the driving power of belt conveyor 22 can be reduced, enabling the extension of the life of belt 29.

Various shapes can be considered for the dispersing plate 26b. However, a V shape whose both sides in belt carrying direction are symmetrical, is simple and reliably effective. The angle α of the front end of dispersing plate 26b, facing the flow of particulate body is preferably 50 to 60°.

The amount Q (m³/h) of particulate body discharged from supply pipe 25b can be calculated by the formula (1), as in the case of supply pipe 25a. However, the value p in formula (1) is a notch height measured from the lower end of supply pipe 25b, not from the surface of belt. The reason is that, as shown in FIG. 4(c), the particulate body discharged from the supply pipe 25a is already present in the height s extending from the surface of belt to the lower end of supply pipe 25b.

In the supply pipes 25b, 25c, ... 25e which are the second and later from the upstream side of belt running direction, the height s from the surface of belt to the lower end of supply pipe is preferred to be at least 3 times the average particle diameter of particulate body and more preferred to be specifically 3 to 5 times. By employing the s of such a value, the particulate body carried from the upstream can be passed with no choking therein.

The discharging equipment 20 of the present invention can be made compact by positioning the lower ends of supply pipes 25a, 25b, ... 25e above the running locus (preferably one running locus) on belt 29. In the discharging equipment of the present invention, the distances among supply pipes 25a, 25b, ... 25e can be determined as desired; therefore, containers can be placed directly right above individual supply pipes. As a result, devices (e.g. chutes each connecting a container and a supply pipe) are not required, unlike in conventional equipments. For these reasons, the present discharging equipment requires no large space in the vertical direction. This can make lower the position of each upper end of containers 10a, 10b, ... 10e and smaller the structure required for mounting of each container.

The fitting of belt supports 27a, 27b, ... 27e at the lower surface of belt 29 can make precise and constant the distance between each lower end of supply pipes 25a, 25b, ... 25e and the upper surface of belt 29. As a result, the particulate body can be discharged at a high quantitative precision. Even when the belt 29 cuts suddenly upon accident, the particulate body flowing from the containers 10a, 10b, ... 10e is accepted by the belt supports 27a, 27b, ... 27e. Accordingly, it can prevent the flowing-out of a large amount of particulate body into the casing 21.

Incidentally, in the above embodiment, the particulate body inlets 23a, 23b, ... 23e were formed linearly at the upper portion of casing 21. However, they may be provided, as necessary, at any desired sites of casing 21 upper portion.

It is possible that particulate body inlets 23a, 23b, ... 23e are not provided at the casing 21 and supply pipes 25a, 25b, ... 25e are provided so as to directly penetrate the wall of casing 21. However, it is preferred to be able to easily conduct maintenance and inspection operations such as adjustment of the distance between each lower end of supply pipes 25a, 25b, . . . 25e and the upper surface of belt 29, inspection of dispersing plates 26b, 26c, . . . 26e, exchange of belt 29, and the like.

Therefore, it is preferred to employ such a structure that particulate body inlets 23a, 23b, . . . 23e are provided at the casing 21 and supply pipes 25a, 25b, . . . 25e can be removed from the casing 21. The supply pipes 25a, 25b, . . . 25e need not be vertical and may be fitted at a certain inclination.

The invention claimed is:

1. A fixed amount discharging equipment for simultaneously discharging particulate bodies from a plurality of containers containing particulate bodies, the fixed amount discharging equipment comprises
   a casing having a belt conveyor inside and a particulate body outlet below the end of the carrying direction of the belt conveyor, and
   a plurality of supply pipes arranged along the carrying direction of the belt conveyor, whose lower end portions penetrate into the casing and whose lower ends extend to above the belt of the belt conveyor,
   in which equipment the lower end portion of each supply pipe has, at its downstream side in the carrying direction of the belt, a notch of predetermined length extending upward from the lower end of pipe,
   wherein a first supply pipe from the upstream side of belt carrying direction is provided so that a distance between the lower end of pipe and the upper surface of belt becomes 2 to 3 times the average particle diameter of the particulate body.

2. The fixed amount discharging equipment according to claim 1, wherein a belt support is provided slidably at the lower surface portion of the belt, corresponding to the lower end of each supply pipe, in contact with the belt.

3. A fixed amount discharging equipment for simultaneously discharging particulate bodies from a plurality of containers containing particulate bodies, the fixed amount discharging equipment comprises
   a casing having a belt conveyor inside and a particulate body outlet below the end of the carrying direction of the belt conveyor, and
   a plurality of supply pipes arranged along the carrying direction of the belt conveyor, whose lower end portions penetrate into the casing and whose lower ends extend to above the belt of the belt conveyor,
   in which equipment the lower end portion of each supply pipe has, at its downstream side in the carrying direction of the belt, a notch of predetermined length extending upward from the lower end of pipe,
   wherein a second supply pipe and later supply pipes from the upstream side of belt carrying direction are each provided, at the lower end portion, with a V-shaped dispersing plate which is gradually larger from the upstream side toward the downstream side.

4. The fixed amount discharging equipment according to claim 3, wherein a belt support is provided slidably at the lower surface portion of the belt, corresponding to the lower end of each supply pipe, in contact with the belt.

5. A fixed amount discharging equipment for simultaneously discharging particulate bodies from a plurality of containers containing particulate bodies, the fixed amount discharging equipment comprises
   a casing having a belt conveyor inside and a particulate body outlet below the end of the carrying direction of the belt conveyor, and
   a plurality of supply pipes arranged along the carrying direction of the belt conveyor, whose lower end portions penetrate into the casing and whose lower ends extend to above the belt of the belt conveyor,
   in which equipment the lower end portion of each supply pipe has, at its downstream side in the carrying direction of the belt, a notch of predetermined length extending upward from the lower end of pipe,
   wherein a second supply pipe and later supply pipes from the upstream side of belt carrying direction are each provided so that a distance between the lower end of pipe and the upper surface of belt becomes 3 to 5 times the average particle diameter of the particulate body.

6. The fixed amount discharging equipment according to claim 5, wherein a belt support is provided slidably at the lower surface portion of the belt, corresponding to the lower end of each supply pipe, in contact with the belt.

* * * * *